United States Patent
Lin et al.

(10) Patent No.: US 10,822,239 B2
(45) Date of Patent: Nov. 3, 2020

(54) MICROWAVE SYSTEM AND METHOD FOR GRAPHENE PRODUCTION

(71) Applicant: Nanotek Instruments, Inc., Dayton, OH (US)

(72) Inventors: Yi-Jun Lin, Taoyuan (TW); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 335 days.

(21) Appl. No.: 15/491,714

(22) Filed: Apr. 19, 2017

(65) Prior Publication Data

US 2018/0305213 A1    Oct. 25, 2018

(51) Int. Cl.
*C01B 32/192* (2017.01)
*B01J 19/12* (2006.01)
(Continued)

(52) U.S. Cl.
CPC .......... *C01B 32/192* (2017.08); *B01J 19/126* (2013.01); *B01J 19/22* (2013.01); *C01B 32/19* (2017.08);
(Continued)

(58) Field of Classification Search
CPC ..... C01B 32/192; C01B 32/194; C01B 32/19; C25B 1/00; B01J 19/126; B01J 19/22;
(Continued)

(56) References Cited

U.S. PATENT DOCUMENTS

| 2,798,878 A | 7/1957 | Hummers |
| 6,872,330 B2 | 3/2005 | Mack et al. |

(Continued)

FOREIGN PATENT DOCUMENTS

GB    2065138 A  *  6/1981  ............ C08L 101/00

OTHER PUBLICATIONS

Lee, Kwang Hoon, et al. "Nitrogen-doped graphene nanosheets from bulk graphite using microwave irradiation." ACS applied materials & interfaces 6.9 (2014): 6361-6368.*

(Continued)

*Primary Examiner* — Richard M Rump

(57) ABSTRACT

Provided is a method of producing graphene from a microwave-expandable un-exfoliated graphite or graphitic carbon, comprising: (a) feeding a powder of the microwave-expandable material onto a non-metallic solid substrate, wherein the powder is in a ribbon shape having a first ribbon width and a first ribbon thickness; (b) moving the ribbon-shape powder into a microwave applicator chamber containing a microwave power zone having a microwave application width (no less than the first ribbon width) and a microwave penetration depth (no less than the first ribbon thickness) so that the entire ribbon-shape powder receives and absorbs microwave power with a sufficient power level for a sufficient length of time to exfoliate and separate the powder for producing graphene sheets; and (c) moving the graphene sheets out of the microwave chamber, cooling the graphene sheets, and collecting the graphene sheets in a collector container or for a subsequent use.

15 Claims, 4 Drawing Sheets

Several single-layer graphene sheets overlapped together during TEM specimen preparation ___ 100 nm

(51) Int. Cl.
  *B01J 19/22* (2006.01)
  *C01B 32/19* (2017.01)
  *C01B 32/194* (2017.01)
  *C25B 1/00* (2006.01)
(52) U.S. Cl.
  CPC .............. *C01B 32/194* (2017.08); *C25B 1/00* (2013.01); *B01J 2219/0871* (2013.01); *B01J 2219/0879* (2013.01); *B01J 2219/1218* (2013.01); *B01J 2219/1239* (2013.01)
(58) Field of Classification Search
  CPC ........ B01J 2219/0871; B01J 2219/1239; B01J 2219/0879; B01J 2219/1218
  See application file for complete search history.

(56) References Cited

U.S. PATENT DOCUMENTS

| | | |
|---|---|---|
| 7,071,258 B1 | 7/2006 | Jang et al. |
| 8,114,375 B2 * | 2/2012 | Jang ............ B82Y 30/00 252/378 R |
| 8,747,623 B2 | 6/2014 | Zhamu et al. |
| 2004/0127621 A1 * | 7/2004 | Drzal ............ C08K 3/04 524/424 |
| 2006/0148965 A1 | 7/2006 | Drzal et al. |

OTHER PUBLICATIONS

Sridhar, V., Jin-Han Jeon, and Il-Kwon Oh. "Microwave extraction of graphene from carbon fibers." Carbon 49.1 (2011): 222-226.*

Bor Z. Jang and A Zhamu, "Processing of Nano Graphene Platelets (NGPs) and NGP Nanocomposites: A Review," Materials Sci. 43 (2008) 5092-5101.

Yang et al. "Tow-dimensional Graphene Nano-ribbons" J. Am Chem Soc. 130 (2008) 4216-17.

PCT/US17/36673 International Search Report and Written Opinion dated Sep. 7, 2017, 7 pages.

* cited by examiner

MICROWAVE SYSTEM AND METHOD FOR GRAPHENE PRODUCTION

FIELD OF THE INVENTION

The present invention relates to a system and method of producing graphene materials from intercalated graphite, intercalated graphitic carbon, graphite oxide, oxidized graphitic carbon, and graphite fluoride.

BACKGROUND

A single-layer graphene sheet is composed of carbon atoms occupying a two-dimensional hexagonal lattice. Multi-layer graphene is a platelet composed of more than one hexagonal plane of carbon atoms. Few-layer graphene sheets or platelets refer to a graphene material having 2-10 hexagonal planes of carbon atoms. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene 5% by weight of fluorine), graphene fluoride ((≥5% by weight of fluorine), other halogenated graphene, hydrogenated graphene, and chemically functionalized graphene.

Graphene has been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was world's first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). Prior to intercalation or oxidation, graphite has an inter-graphene plane spacing of approximately 0.335 nm ($L_a=\frac{1}{2}d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,200° C.) for a short period of time (typically 30 seconds to 3 minutes) to exfoliate the GIC or GO for the formation of exfoliated graphite (or further expanded graphite), which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

The thermal exfoliation requires the use of a high temperature furnace pre-set a temperature of typically from 800 to 1,200° C. and, thus, is a highly energy-intensive process. Furthermore, oven-based thermal exfoliation alone normally leads to the formation of mostly graphite worms, which must be subjected to further mechanical shearing to produce separated graphene sheets. A need exists for a more energy-efficient and effective method of producing ultra-thin graphene sheets (mostly single-layer or few-layer).

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [[B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)].

Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Tow-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Microwaves have been used to assist the production of exfoliated graphite (graphite worms), graphite nano platelets (or expanded graphite), and graphene. For instance, L. Drzal, et al. used microwave as heating means to produce exfoliated graphite nano platelets ["Expanded Graphite and Products Produced Therefrom," US Pub. No. 20040127621 (Jul. 1, 2004) and US 20060148965 (Jul. 6, 2006)]. In this prior art process, natural graphite was intercalated and oxidized by using strong acids and oxidizers. After the intercalation/oxidation treatment, the natural graphite was rinsed, dried, and recovered from the liquid. This dried powder was GIC or GO, which was then subjected to microwave heating to obtain exfoliated graphite nano platelets, but not thin graphene sheets (i.e. single-layer or few-layer graphene). Furthermore, typically some of the GIC was not expanded or exfoliated and, hence, the process requires extra steps to separate (isolate) the exfoliated platelets from the un-exfoliated graphite particles.

Zhu, et al. used microwaves to assist in both the exfoliation and reduction of dried graphite oxide powders [Yanwu Zhu, et al.' "Microwave assisted exfoliation and reduction of graphite oxide for ultracapacitors," Carbon, Vol. 48, Issue 7, June 2010, Pages 2118-2122]. Natural graphite was oxidized and intercalated to produce GO/GIC. This process suffers from the same drawbacks as the Drzal's process. The products are basically microwave-exfoliated graphite oxide worms that are not fully separated/isolated graphene sheets.

The same problems are also associated with the work by Khavrel, et al. [P. A. Khavrel, et al., "Fluorinated microwave exfoliated graphite oxide: structural features and double layer capacitance," Fullerenes, Nanotubes and Carbon Nanostructures, Volume 24, 2016—Issue 4]. Natural graphite was oxidized to make graphite oxide (GO), which was then exfoliated to make graphite oxide worms and platelets. The exfoliated GO platelets were then fluorinated to become fluorinated graphite oxide.

Chen, et al. used a combination of microwaves and a chemical reducing agent to reduce graphene oxide in a solution state [Wufeng Chen, Lifeng Yan, Prakriti R. Bangal, "Preparation of graphene by the rapid and mild thermal reduction of graphene oxide induced by microwaves," Carbon, Volume 48, Issue 4, April 2010, Pages 1146-1152]. The graphene oxide sheets had been previously produced using oxidation of graphite to produce graphite oxide, and then exfoliation and separation of individual graphene oxide sheets using solution ultrasonication of graphite oxide. Microwave was used to help reduce the already-made graphene oxide sheets in a liquid solution, a mixed solution of N,N-dimethylacetamide and water (DMAc/H2O).

Similarly, Voiry, et al. [Damien Voiry, et al., "High-quality graphene via microwave reduction of solution-exfoliated graphene oxide," *Science,* 23 Sep. 2016: Vol. 353, Issue 6306, pp. 1413-1416] prepared graphite oxide powder from natural graphite. The graphite oxide was then dispersed in a liquid to form a solution (e.g. GO+water), which was exfoliated using ultrasonic waves to produce graphene oxide sheets. The graphene oxide sheets were then dried and thermally reduced to become reduced graphene oxide (RGO) using a microwave oven. It may be noted that microwave was not used to exfoliate the graphite oxide; instead, microwave was used to thermally reduce the already dried, ultrasonic-exfoliated graphene oxide sheets.

Our research group makes use of a combination of microwaves and some strong acids to directly produce graphene sheets from non-oxidized and non-intercalated graphite [A. Zhamu and Bor Z. Jang, "One-Step Production of Graphene Materials," U.S. patent application Ser. No. 13/317,100 (Oct. 11, 2011); now U.S. Pat. No. 8,747,623 (Jun. 10, 2014)]. A few years later, Matsumoto, et al. use a combination of microwaves and a specific group of oligomeric ionic liquids to directly produce graphene from natural graphite dispersed in such an ionic liquid [Michio Matsumoto, Yusuke Saito, Chiyoung Park, Takanori Fukushima, & Takuzo Aida,' "Ultrahigh-throughput exfoliation of graphite into pristine 'single-layer' graphene using microwaves and molecularly engineered ionic liquids," Nature Chemistry, 7 (2015) 730-735]. This group of ionic liquids is difficult to produce and is very expensive, not conducive to large-scale production.

Hence, an urgent need exists to have a graphene production process that requires a shortened process time and less energy consumption. The process must be able to produce ultra-thin graphene sheets (mostly single-layer graphene or a mixture of single-layer and few-layer graphene sheets) and must not require extra steps to separate graphene sheets from un-exfoliated graphite powder.

SUMMARY OF THE INVENTION

The present invention provides a method of producing graphene from a microwave-expandable un-exfoliated graphite or graphitic carbon. The method comprises: (a) supplying and feeding a powder of the microwave-expandable un-exfoliated graphite or graphitic carbon onto a non-metallic solid substrate surface, wherein the powder is substantially in a ribbon shape having a first ribbon width and a first ribbon thickness; (b) moving the ribbon-shape powder into a microwave applicator chamber containing a microwave power zone having a microwave application width and a microwave penetration depth, wherein the microwave application width is no less than the first ribbon width and the microwave penetration depth is no less than the first ribbon thickness so that the entire ribbon-shape powder receives and absorbs microwave power with a sufficient power level for a sufficient length of time to exfoliate and separate the microwave-expandable un-exfoliated graphite or graphitic carbon into graphene sheets that occupy an expanded volume having a second width, greater than the first ribbon width, and a second thickness, greater than the first ribbon thickness; and (c) moving the graphene sheets out of the microwave chamber, cooling the graphene sheets, and collecting the graphene sheets (e.g. in a collector vessel).

In certain embodiments of the invention, the microwave-expandable un-exfoliated graphite or graphitic carbon is selected from intercalated natural graphite, oxidized natural graphite, fluorinated natural graphite, intercalated synthetic graphite, oxidized synthetic graphite, fluorinated synthetic graphite, intercalated amorphous graphite, oxidized amorphous graphite, fluorinated amorphous graphite, intercalated highly oriented pyrolytic graphite (HOPG), oxidized HOPG, fluorinated HOPG, intercalated meso-carbon micro-bead, oxidized meso-carbon micro-bead, fluorinated meso-phase carbon, intercalated needle coke, oxidized needle coke, fluorinated needle coke, intercalated carbon or graphite fiber, oxidized carbon or graphite fiber, fluorinated carbon or graphite fiber, intercalated carbon nano-fiber, oxidized carbon nano-fiber, fluorinated carbon nano-fiber, nitrogenated graphite, chlorinated graphite, brominated graphite, iodized graphite, or a combination thereof. The starting graphite or graphitic carbon material preferably have a length smaller than 50 µm, more preferably less than 20 µm, further preferably less than 10 µm, and most preferably less than 3 µm.

In certain embodiments, the powder of microwave-expandable un-exfoliated graphite or graphitic carbon further contains 0.1% to 20% by weight (preferably from 1% to 10% by weight) of a dielectric heating promoter selected from water, polar organic molecule, inorganic dielectric material, or a combination thereof. The powder must remain in a substantially solid state. Even with up to 20% by weight of water in a graphitic material, the graphite powder is still a solid.

In certain preferred embodiments, the residence time for the microwave-expandable un-exfoliated graphite or graphitic carbon in the microwave power zone is from 10 seconds to 5 minutes, preferably from 30 seconds to 3 minutes.

Preferably, the first ribbon width is selected from the range from 1 mm to 10 cm and the first ribbon thickness is from 10 nm to 3.8 cm. More preferably, the first ribbon width is selected from the range of 5 mm to 5 cm and the first ribbon thickness is from 1 µm to 2.5 cm. Most preferably, the first ribbon width is selected from the range of 1 cm to 3 cm and the first ribbon thickness is from 0.1 mm to 1.0 cm.

We have found that, if the powder fed into the microwave application chamber is confined in a width covered by (reachable by) the high-power microwaves and the microwaves fully penetrate the thickness of the powder sample, the powder can be exfoliated to the greatest extent in such a manner that most of the graphene planes are fully exfoliated and separated from one another. The resulting products are a mass of substantially fully separated graphene sheets, in contrast to the exfoliated graphite worms commonly observed in prior art process of exfoliation of intercalated graphite or graphite oxide. The original powder (having a first width, $w_1$, and a first thickness $t_1$) is dramatically expanded to a volume (having a second width and a second thickness) that can be 300-1000 times of the original powder volume. The second width-to-first width ratio can be as high as 500, more typically from 3 to 300, further more typically from 10 to 100. The thickness of the powder is also significantly increased. As a result, the graphene sheets produced typically contains at least 80% single-layer graphene sheets and more typically contain 90% single-layer graphene. The rest of graphene sheets are mostly few-layer graphene, having 2-10 layers of hexagonal carbon atom planes.

It may be noted that the ribbon shape of the powder is just an example to illustrate the best mode of practice. One does not have to feed the powder into a ribbon shape; it can be any shape and dimension provided that the microwave power is substantially "focused" or confined to a microwave-effective volume that completely encloses the volume of powder fed into the microwave application zone. The powder fed into the microwave application zone can be in any shape or dimensions provided substantially all the powder material is inside this microwave-effective volume, which may be conveniently designed to be a more or less rectangular volume, having a width and a thickness. The conveyor moves the powder into and then out of the microwave application chamber in such a manner that the maximum powder sample width is less than the width of the microwave-effective volume and the maximum powder sample thickness is less than the microwave penetration depth of this device. Given the same microwave frequency (e.g. 2.45 GHz or 915 MHz), this penetration depth varies from one expandable graphitic material to another, but typically from 1 cm to 4 cm.

Thus, the present invention also provides a method of producing graphene from a microwave-expandable un-exfoliated graphite or graphitic carbon. The method comprises: (a) supplying and feeding a volume of the microwave-expandable un-exfoliated graphite or graphitic carbon powder onto a non-metallic solid substrate surface, wherein the powder volume has a maximum width and a maximum thickness; (b) moving the powder into a microwave applicator chamber containing a microwave power zone having a microwave application width and a microwave penetration depth, wherein the microwave application width is no less than the maximum width of the powder volume and the microwave penetration depth is no less than the maximum thickness of the powder volume so that the entire powder volume receives and absorbs microwave power with a sufficient power level for a sufficient length of time to exfoliate and separate the microwave-expandable un-exfoliated graphite or graphitic carbon into graphene sheets that occupy an expanded volume having a second width, greater than the maximum width, and a second thickness, greater than the maximum thickness; and (c) moving the graphene sheets out of the microwave chamber, cooling the graphene sheets, and collecting the graphene sheets (e.g. in a collector vessel).

Depending upon the type of starting graphite or graphitic carbon material, the graphene sheets produced with the invented method may contain pristine graphene, oxidized graphene with less than 5% oxygen content by weight, graphene fluoride, graphene fluoride with less than 5% fluorine by weight, graphene with a carbon content no less than 95% by weight, or functionalized graphene.

The powder of microwave-expandable un-exfoliated graphite or graphitic carbon may be fed and moved into microwave application chamber in a continuous or intermittent manner.

Optionally, the graphene sheets may be subjected to a mechanical shearing treatment to produce reduce the sizes of the graphene sheets. The mechanical shearing treatment may comprise using air milling, air jet milling, ball milling, rotating-blade mechanical shearing, ultrasonication, cavitation, or a combination thereof.

The invention also provides a focused microwave-based system for producing graphene sheets from a microwave-expandable un-exfoliated graphite or graphitic carbon. The system comprises: (A) solid powder-feeding and guiding means that is capable of supplying and feeding a substantially ribbon-shape powder of a microwave-expandable un-exfoliated graphite or graphitic carbon onto a solid substrate surface, wherein the ribbon-shape powder has a first ribbon width and a first ribbon thickness; (B) a conveyor device, in working relation to the powder-feeding and guiding device and supporting or containing the non-metallic solid substrate, moves the ribbon-shape powder into at least a microwave applicator chamber (can contain multiple chambers); (C) a microwave power supply and power-focusing subsystem that induces a microwave power zone in the microwave application chamber, wherein the microwave power zone has a microwave application width, no less than the first ribbon width, and a microwave penetration depth, no less than the first ribbon thickness, so that the entire ribbon-shape powder receives and absorbs microwave power to form graphene sheets via microwave heat-activated exfoliation and separation of the powder; and (D) a collector to collect the graphene sheets.

The solid powder-feeding and guiding means may contain a feeder device selected from a vibratory feeder, gravimetric feeder, volumetric auger-type feeder, injector, compressed air-assisted feeder, vacuum-assisted feeder, gravity feeder, drum feeder, wheel feeder, slide, chute, conveyor feeder, or a combination thereof. Preferably, the solid powder-feeding and guiding means contains a guiding device to control the first ribbon width and a wiper to control the first thickness of the powder.

In the focused microwave-based system, the microwave power supply and power-focusing sub-system may contain multiple microwave application chambers. The microwave power supply and power-focusing sub-system may provide a microwave power from 200 W to 200 kW, preferably from 400 W to 100 kW, and more preferably from 700 W to 50 kW.

In certain embodiments, the focused microwave-based system may further include means of introducing a protective gas atmosphere into said microwave applicator chamber, wherein the protective gas atmosphere contains a noble gas, nitrogen gas, hydrogen gas, or a combination thereof. The focused microwave-based system may further include a cooling zone wherein the graphene sheets are cooled after microwave heat-activated exfoliation and separation of the powder.

In certain embodiments, the focused microwave-based system may further include means to allow exhaust gas to exit or scrubber means to capture exhaust gas.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or hexagonal carbon atom planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite or graphitic carbon particle, which can be a graphite flake, carbon/graphite fiber segment, carbon/graphite whisker, carbon/graphite nano-fiber, disordered carbon (including soft carbon and hard carbon), etc.

One preferred specific embodiment of the present invention is a method of producing a graphene material (also referred to as nano graphene platelet, NGP) that is essentially composed of a sheet of graphene plane or multiple sheets of graphene plane stacked and bonded together (typically, on an average, up to 5 sheets per multi-layer platelet). Each graphene plane, also referred to as a graphene sheet, comprises a two-dimensional hexagonal structure of carbon atoms. Each platelet has a length and a width parallel to the graphene plane and a thickness orthogonal to the graphite plane. By definition, the thickness of an NGP is 100 nanometers (nm) or smaller, with a single-sheet NGP being as thin as 0.34 nm. However, the presently invented method produces graphene sheets that contain typically from 1 to 10 layers, or from 0.34 nm to 3.4 nm. In many cases, the graphene sheets produced are mostly single-layer graphene. The length and width of a NGP are typically between 200 nm and 20 μm.

Figure 1:
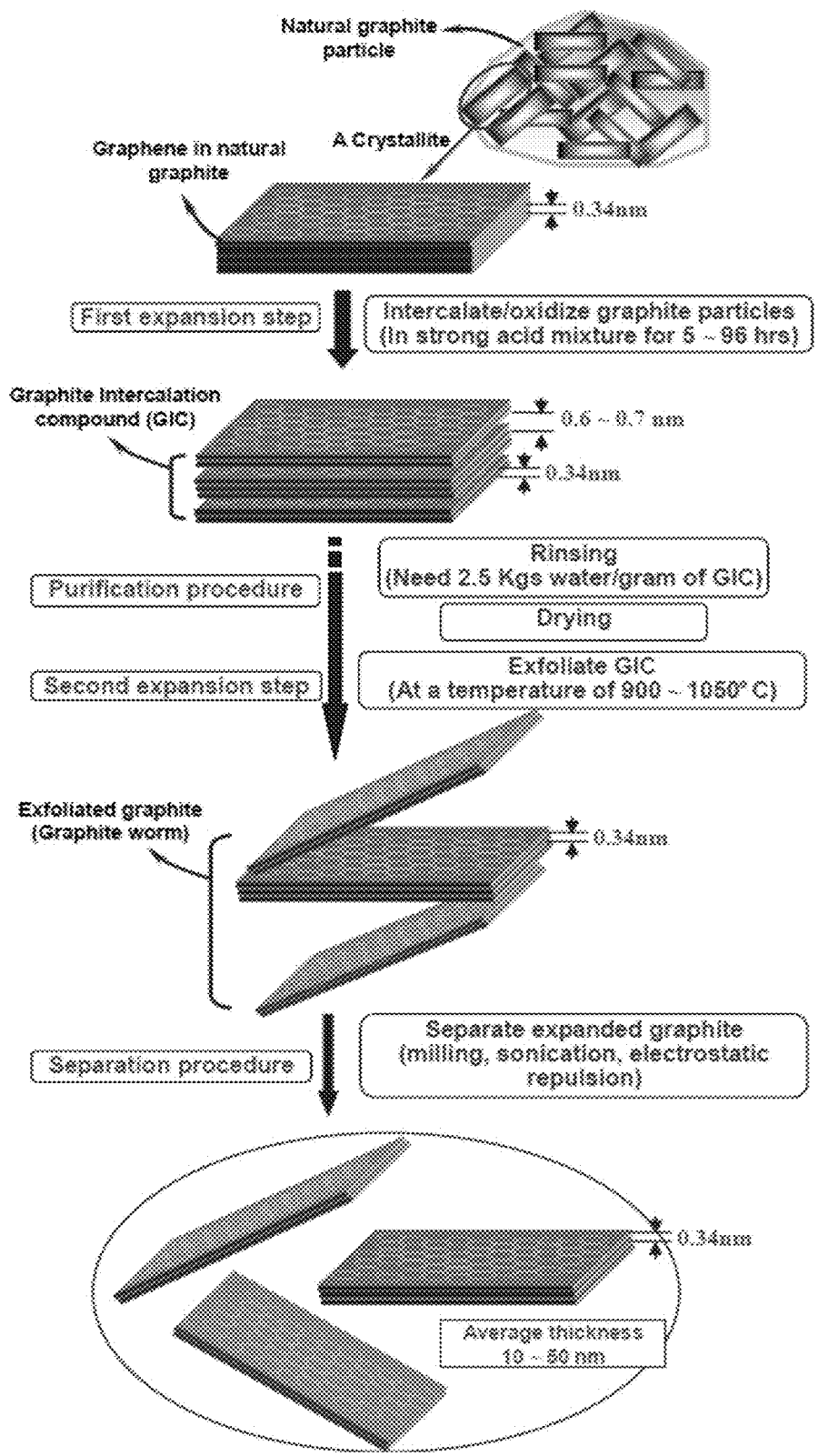
FIG. 1 A flow chart showing the most commonly used prior art process of producing graphite intercalation compound (GIC) or graphite oxide.

As illustrated in FIG. 1, the prior art chemical processes for graphene production typically involve immersing natural graphite powder in a mixture of concentrated sulfuric acid, nitric acid, and an oxidizer, such as potassium permanganate or sodium perchlorate. It typically requires 5-120 hours to complete the chemical intercalation/oxidation reaction. Once the reaction is completed, the slurry is subjected to repeated steps of rinsing and washing with water and then subjected to drying treatments to remove water. The dried powder is commonly referred to as graphite intercalation compound (GIC) or graphite oxide (GO). This GO/GIC is then subjected to a thermal shock treatment, which is most typically accomplished by exposing the GIC/GO to a furnace pre-set at a temperature of typically 800-1200° C. (more typically 950-1050° C.). This furnace-based thermal shock operation is not energy-efficient, typically leads to the formation of exfoliated graphite worms (that require further mechanical shearing or ultrasonication to produce separated/isolated graphene sheets), and is not readily amenable to the formation of ultra-thin graphene sheets (single-layer or few-layer).

Figure 2A:
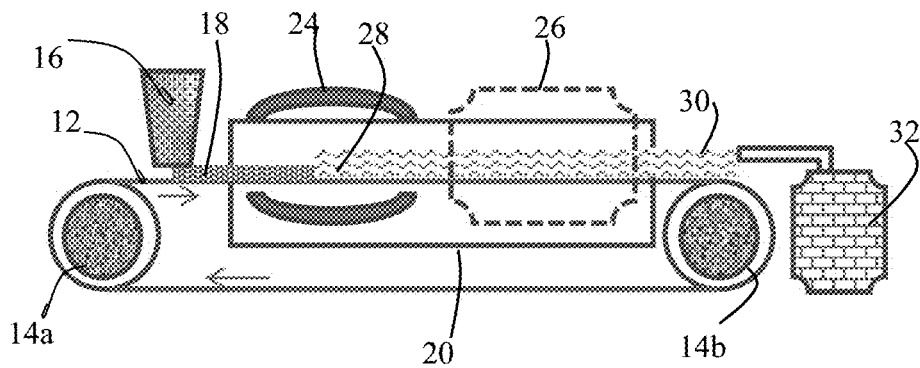
FIG. 2(A) Schematic of a method of producing graphene sheets from a microwave-expandable graphitic material.
Figure 2B:
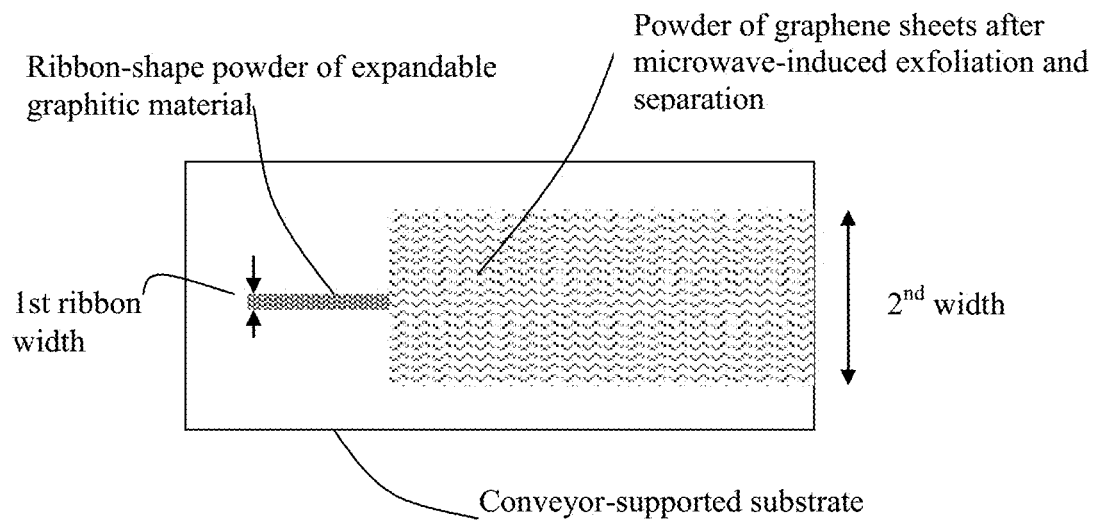
FIG. 2(B) Schematic of a ribbon-shape powder of expandable graphitic material having an initial width (first width), which is expanded and exfoliated to a powder of graphene sheets having an expanded powder width dramatically larger than the initial powder width.

In certain embodiments, referring to FIG. 2(A) and FIG. 2(B) as an illustrative example, the invented method comprises:
(a) using a powder feeder (16) to feed a powder (18) of a microwave-expandable un-exfoliated graphite or graphitic carbon onto a non-metallic solid substrate surface (e.g. supported by or contained in a conveyor belt (12)), wherein the powder is substantially in a ribbon shape having a first ribbon width, a first ribbon thickness, and a length (the length of this ribbon is "dynamic" since the apparatus continues to feed the powder and move the powder into the microwave applicator chamber while the exfoliated powder is continuously moved out of the microwave heating zone);
(b) moving the ribbon-shape powder into a microwave applicator chamber (first part of a powder treatment zone 20) containing a microwave power zone (e.g. under the focused microwave guide and power confinement sub-system 24) having a microwave application width and a microwave penetration depth, wherein the microwave application width is no less than the first ribbon width and the microwave penetration depth is no less than the first ribbon thickness so that the entire ribbon-shape powder receives and absorbs microwave power with a sufficient power level for a sufficient length of time to exfoliate and separate the microwave-expandable un-exfoliated graphite or graphitic carbon (powder 18) into graphene sheets (28) that occupy an expanded volume having a second width, greater than the first ribbon width, and a second thickness, greater than the first ribbon thickness; and (c) moving the graphene sheets out of the microwave chamber, cooling the graphene sheets (e.g. in a cooling zone, 26), and collecting the cooled graphene sheets (30) using a collector (e.g. a vacuum-assisted collector vessel, 32). The moving conveyor (12) is driven by a pair of rollers (14*a* and 14*b*). At least one of the two rollers is powered by a motor.

The microwave-expandable un-exfoliated graphite or graphitic carbon may be selected from intercalated natural graphite, oxidized natural graphite, fluorinated natural graphite, intercalated synthetic graphite, oxidized synthetic graphite, fluorinated synthetic graphite, intercalated amorphous graphite, oxidized amorphous graphite, fluorinated amorphous graphite, intercalated highly oriented pyrolytic graphite (HOPG), oxidized HOPG, fluorinated HOPG, intercalated meso-carbon micro-bead, oxidized meso-carbon micro-bead, fluorinated meso-phase carbon, intercalated needle coke, oxidized needle coke, fluorinated needle coke, intercalated carbon or graphite fiber, oxidized carbon or graphite fiber, fluorinated carbon or graphite fiber, intercalated carbon nano-fiber, oxidized carbon nano-fiber, fluorinated carbon nano-fiber, nitrogenated graphite, other halogenated graphite, or a combination thereof. The starting graphite or graphitic carbon material preferably have a length smaller than 50 µm, more preferably less than 20 µm, further preferably less than 10 µm, and most preferably less than 3 µm.

There has been no prior art method that is so versatile and effective in producing ultra-thin graphene sheets (mostly single-layer graphene or a mixture of single-layer graphene and few-layer graphene) from so many different types of graphitic materials.

In certain embodiments, the powder of microwave-expandable un-exfoliated graphite or graphitic carbon further contains 0.1% to 20% by weight (preferably from 1% to 10% by weight) of a dielectric heating promoter selected from water, polar organic molecule (e.g. acetone, alcohol, parylene, etc.), inorganic dielectric material (e.g. various metal oxides, nitrides, borides, or carbides; a salt, such as $NaH_2PO_4$, a zeolite, etc.) or a combination thereof. The powder must remain in a substantially solid state. Even with up to 20% by weight of water in a graphitic material, the graphite powder is still a solid.

Figure 3:
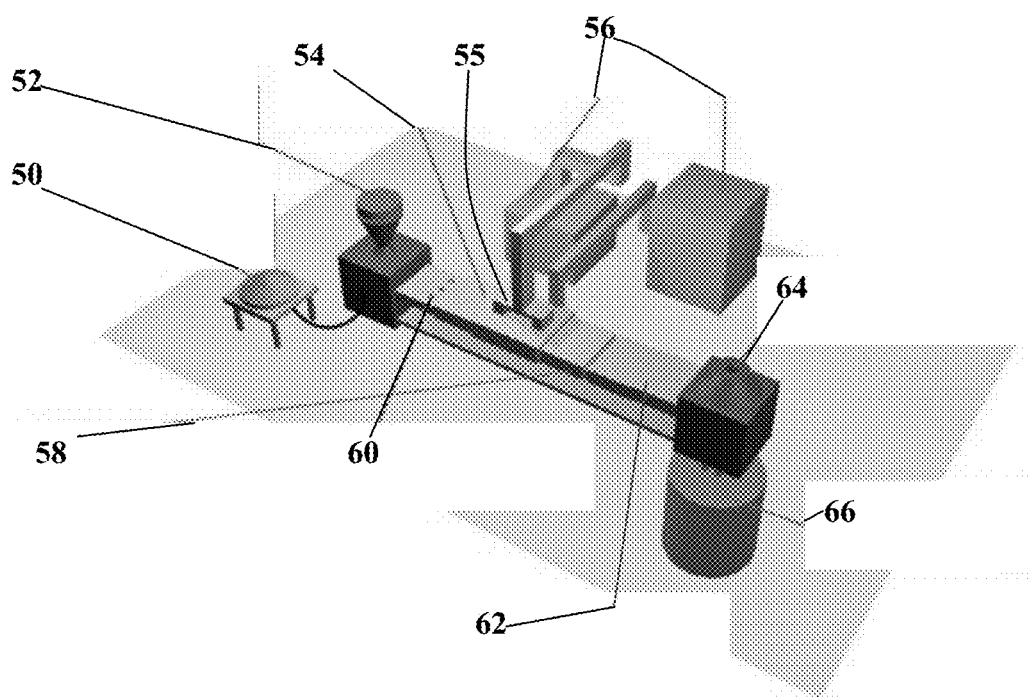
FIG. 3 Schematic of a focused microwave power-based apparatus for producing graphene materials.

Another embodiment of the present invention is a focused microwave-based system or apparatus for producing graphene sheets from a microwave-expandable un-exfoliated graphite or graphitic carbon. Referring to FIG. 3 as an illustrative example, the system comprises:

(A) solid powder-feeding and guiding means (e.g. a vacuum-assisted feeder 52 and a storage tank 50 for the expandable material) that is capable of supplying and feeding a substantially ribbon-shape powder of a microwave-expandable un-exfoliated graphite or graphitic carbon onto a non-metallic solid substrate surface (of a conveyor belt 58), wherein the ribbon-shape powder has a first ribbon width and a first ribbon thickness;

(B) a conveyor device 58, in working relation to the powder-feeding and guiding device and supporting or containing the non-metallic solid substrate, moves the ribbon-shape powder into at least a microwave applicator chamber (can contain multiple chambers);

(C) a microwave power supply and power-focusing subsystem (e.g. including microwave generators 56 and transmitter 55) that induces a microwave power zone 54 in the microwave application chamber, wherein the microwave power zone has a microwave application width, no less than the first ribbon width, and a microwave penetration depth, no less than the first ribbon thickness, so that the entire ribbon-shape powder receives and absorbs microwave power to form graphene sheets via microwave heat-activated exfoliation and separation of the powder; and (D) a collector 66 to collect the graphene sheets.

The solid powder-feeding and guiding means may contain a feeder device selected from a vibratory feeder, gravimetric feeder, volumetric auger-type feeder, injector, compressed air-assisted feeder, vacuum-assisted feeder, gravity feeder, drum feeder, wheel feeder, slide, chute, conveyor feeder, or a combination thereof. Preferably, the solid powder-feeding and guiding means contains a guiding device to control the first ribbon width and a wiper to control the first thickness of the powder.

At the far left of FIG. 3 is a vacuum-assisted feeder 52, which draws the powder of the expandable graphite or graphitic carbon from a storage tank 50 and feeds it continuously or intermittently onto a non-metallic surface of a conveyor belt 58. A protective gas inlet 60 is positioned near the entrance of the microwave power zone 54. This gas inlet introduces a protective gas (inert gas, $N_2$, $H_2$, etc.) into the microwave power zone (or powder heating zone).

The microwave power zone is enabled or produced by microwave generators 56 and transmitters 55, which can confine or limit the maximum power into a more or less rectangular zone. The depth of this rectangular microwave power zone should be equal or slightly greater than the maximum microwave penetration depth, which is typically from 1 cm to 4 cm for the expandable graphite or graphitic carbon materials. The powder of expandable graphite or graphitic carbon is transported into and out of the microwave power zone at a speed that allows the powder material to be exposed to microwave power for a sufficient exposure time (or sufficient residence time from entry point to exit point) to undergo effective exfoliation and separation of graphene planes. The produced graphene sheets are then moved into a cooling zone 62 adjacent to the microwave power zone (or heating zone) and then get collected by a collector 66. There can be an exhaust gas exit 64 and a scrubber system to capture the gaseous species.

It may be noted that the powder fed onto the non-metallic substrate surface of a conveyor does not have to take a ribbon shape or any particular shape. However, the maximum width of this shape should not exceed the maximum width of the effective microwave power zone to ensure the entire powder volume is exposed to a desired microwave power. Also, the powder shape can have a varying thickness, but should not have a thickness that exceeds the maximum penetrating depth of a given microwave frequency into a given graphitic material.

Thus, the present invention also provides a method of producing graphene from a microwave-expandable un-exfoliated graphite or graphitic carbon. The method comprises: (a) supplying and feeding a volume of the microwave-expandable un-exfoliated graphite or graphitic carbon powder onto a non-metallic solid substrate surface, wherein the powder volume has a maximum width and a maximum thickness; (b) moving the powder into a microwave applicator chamber containing a microwave power zone having a microwave application width and a microwave penetration depth, wherein the microwave application width is no less than the maximum width of the powder volume and the microwave penetration depth is no less than the maximum thickness of the powder volume so that the entire powder volume receives and absorbs microwave power with a sufficient power level for a sufficient length of time to exfoliate and separate the microwave-expandable un-exfoliated graphite or graphitic carbon into graphene sheets that occupy an expanded volume having a second width, greater than the maximum width, and a second thickness, greater than the maximum thickness; and (c) moving the graphene sheets out of the microwave chamber, cooling the graphene sheets, and collecting the graphene sheets (e.g. in a collector vessel).

The frequency of microwave or radio frequency irradiation that can be used for practicing the instant invention does not have to be limited to 2.45 GHz or 0.915 GHz, which are used in a domestic microwave oven. Preferably, the frequency is between 0.9 and 20 GHz and more preferably between 2 and 10 GHz.

The starting graphitic material may be selected from the intercalated, oxidized, halogenated (including fluorinated, chlorinated, brominated, or iodized), or nitrogenated versions of natural graphite, amorphous graphite (graphite materials containing micro-scaled graphite crystallites, typically 0.1-1.0 μm), synthetic graphite, highly oriented pyrolytic graphite, meso-carbon micro-bead, graphitized meso-phase carbon, needle coke, carbon fiber, graphite fiber, carbon nano-fiber, graphitic nano-fiber, graphite fluoride, chemically modified graphite, expanded graphite, or a combination thereof.

The graphite oxide (GO) may be obtained by immersing powders or filaments of a starting graphite or graphitic carbon (e.g. synthetic graphite powder, soft carbon, hard carbon, carbon nano-fibers, multi-walled carbon nanotubes, graphite fibers, needle coke, etc.) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). Preferably, the oxidation is conducted to the extent that the oxygen content is preferably no less than 20% by weight in the graphite or graphitic carbon material. The oxygen content is more preferably greater than 30% by weight and most preferably greater than 40% by weight. This is followed by repeated rinsing and then drying to obtain graphite oxide or oxidized graphitic carbon. The resulting graphite oxide can then be converted into various functionalized graphite materials by substituting —OH groups in graphite oxide with other chemical groups (e.g. —Br, $NH_2$, etc.), if so desired.

Fluorinated graphene or graphene fluoride is herein used as an example of the halogenated graphene material group. Fluorinated graphene may be obtained by microwave-induced exfoliation of graphite fluorides. Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In (CF), carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

Nitrogenated graphene can be formed at lower temperatures by a hydrothermal method; e.g. by sealing graphite oxide and ammonia in an autoclave and then increased the temperature to 150-250° C. The nitrogen content or combined oxygen and nitrogen amount in the material is preferably at least 20%, more preferably at least 30%, and most preferably greater than 40%.

Acids, such as sulfuric acid, are not the only type of intercalating agent (intercalant) that can penetrate into spaces between graphene planes to obtain GICs. Many other types of intercalating agents, such as alkali metals (Li, K, Na, Cs, and their alloys or eutectics), metal salts (e.g. metal trichloride), and many other organic or inorganic species (e.g. tetra-butyl-ammonium) can be used to intercalate graphite to stage-1, stage-2, stage-3, etc. Stage-n implies one intercalant layer for every n graphene planes. For instance, a stage-1 potassium-intercalated GIC means there is one layer of K for every graphene plane; or, one can find one layer of graphene (designated as "G" here) between two adjacent intercalating agent species planes (designated as "A") in a G/A/G/A/G/A/G sequence, where G is a graphene plane and A is an intercalating agent plane. A stage-2 GIC will have a sequence of GG/A/GG/A/GG/A/GG . . . and a stage-3 GIC will have a sequence of GGG/A/GGG/A/GGG . . . , etc. These GICs can then be fed into the microwave power zone for exfoliation. To produce ultra-thin graphene sheets, the GICs preferably contain only stage-1 or stage-2 compounds, most preferably only stage-1 compounds.

Quite significantly, the required microwave exposure time can be less than 5 minutes, often less than 3 minutes, or even less than 1 minute. The microwave exposure step may be followed by a step of subjecting the resulting exfoliated mass of graphene sheets to a mechanical shearing treatment to produce smaller (shorter or narrower) graphene sheets. The mechanical shearing treatment comprises using air milling, air jet milling, ball milling, rotating-blade mechanical shearing, ultrasonication, cavitation, or a combination thereof.

The presently invented method and associated microwave apparatus are capable of producing single-layer graphene sheets. In many examples, the graphene material produced contains at least 80% or 90% single-layer graphene sheets (remaining graphene sheets being few-layer or no greater than 10 layers). In some samples, the graphene sheets are mostly single-layer. The graphene produced can contain pristine graphene, oxidized graphene with less than 5% oxygen content by weight, graphene fluoride, graphene oxide with less than 5% fluorine by weight, graphene with a carbon content no less than 95% by weight, or functionalized graphene.

The following examples serve to provide the best modes of practice for the present invention and should not be construed as limiting the scope of the invention:

Example 1: Preparation of Graphite Oxide Using a Modified Hummers' Method

Graphite oxide was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately 5 hours at 35° C. It is important to caution that potassium permanganate should be gradually added to sulfuric acid in a well-controlled manner to avoid overheat and other safety issues. Upon completion of the reaction, the sample was then washed repeatedly with deionized water until the pH of the filtrate was approximately 5. The dried products are sulfuric acid-intercalated graphite (GIC) or graphite oxide.

Figure 4:
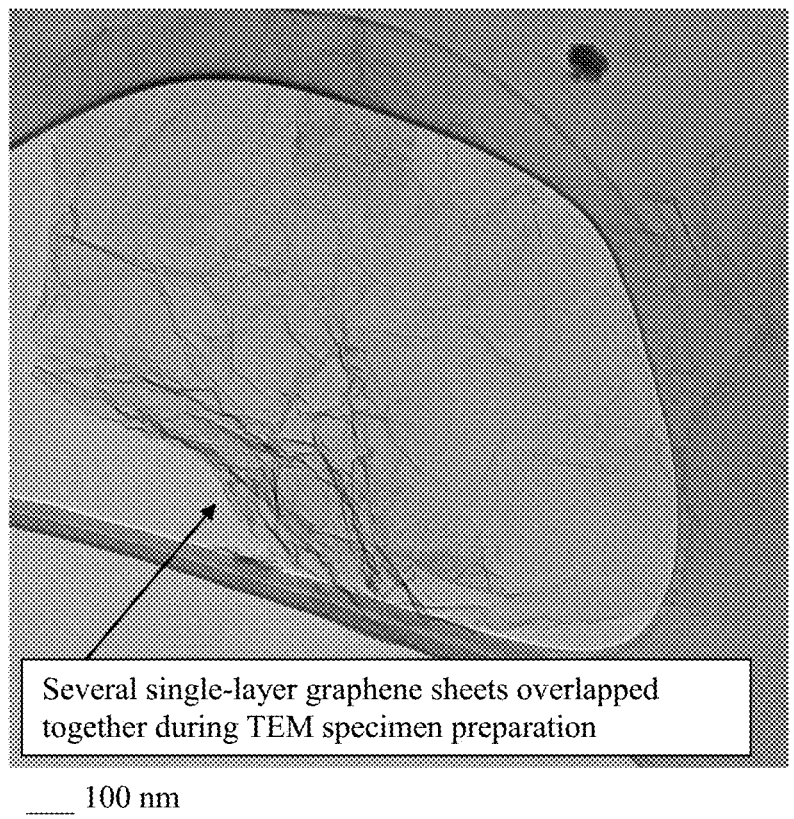
FIG. 4 A TEM image of representative graphene sheets produced by the instant method.

The GIC particles were then exposed to microwave power (25 kW) at 2.45 GHz for 45 seconds to obtain separated/isolated graphene sheets that are mostly single-layer graphene. The ribbon-shape powder was 0.85 cm wide and 0.75 cm thick prior to being moved into the microwave power zone. After microwave exposure for 45 seconds, the ribbon was expanded to 62 cm wide and 4.6 cm thick. FIG. 4 shows a TEM image of representative graphene sheets produced.

Example 2: Production of Isolated Graphene Sheets from Needle Coke

Commercially available needle coke (Jinzhou Petrochemical Co.) was used to prepare intercalated graphitic carbon using an electrochemical intercalation procedure. A sample of surface-treated needle coke (needle-shape coke filaments) was prepared by immersing the filaments in concentrated sulfuric acid for 0.5 hours to remove the hard carbon skin. Needle coke filaments having an average length of 35 µm, were used as the anode material and 1,000 mL of a liquid solution electrolyte (typically 1 M of an alkali metal salt in an organic solvent). A mixture of ethylene carbonate (EC) and propylene carbonate (PC) was used as the solvent. The alkali metal salts used in this example include lithium perchlorate ($LiClO_4$) and sodium perchlorate ($NaClO_4$), separately.

The anode supporting element is a stainless steel plate and the cathode is a graphite foam of approximately 4 cm in diameter and 0.2 cm in thickness, impregnated with lithium or sodium. The separator, a glass fiber fabric, was used to separate the cathode plate from the needle coke filaments and to compress these particles down against the anode supporting element to ensure that the needle coke filaments are in electrical connection with the anode supporting element to serve as the anode. The electrodes, electrolyte, and separator are contained in a Buchner-type funnel to form an electrochemical cell. The anode supporting element, the cathode, and the separator are porous to permit intercalate (contained in the electrolyte) to saturate the needle coke and to pass through the cell from top to bottom.

The needle coke filaments were subjected to an electrochemical charging treatment (i.e. charging alkali metal ions into inter-graphene plane spaces in a needle coke filament at a current of 0.5 amps (current density of about 0.04 amps/$cm^2$) and at a cell voltage of about 4-6 volts for 2-5 hours. These values may be varied with changes in cell configuration and makeup. After the electrochemical charging treatment, the resulting intercalated filaments were washed with water and dried.

Subsequently, some of the intercalated compound was subjected to microwave heating. Various samples were collected with their morphology studied by SEM, TEM, and Raman observations and their specific surface areas measured by the well-known BET method. The BET specific surface area was found to be from 675 to 1,050 $m^2$/g, indicating the graphene sheets being mostly single-layer (>80%) and few-layer varieties. The first powder ribbon width was 4.8 cm and the first ribbon thickness was approximately 2 cm. After exfoliation, the graphene powder was 100 cm wide (being confined between two Teflon plate-based walls) and 9.5 cm thick.

Example 3: Preparation of Discrete GO Sheets from Graphite Fibers

Chopped graphite fibers with an average diameter of 12 µm were used as a starting material, which was immersed in a mixture of concentrated sulfuric acid, nitric acid, and potassium permanganate (as the chemical intercalate and oxidizer) to prepare fiber-based graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 12 hours of reaction, the acid-treated graphite fibers were filtered and washed thoroughly with deionized water until the pH level of the solution reached 6. After being dried at 60° C. overnight, the resulting graphite oxide fiber powder, in a ribbon shape having a first width of 5 cm and first thickness of 2.5 cm, was subjected to microwave treatments (25 kW for 30 seconds). The resulting exfoliated powder contains all single-layer or few-layer graphene sheets, no un-exfoliated graphite fiber powder.

For comparison, two samples of the same graphite oxide fiber powder were subjected to the same microwave treatment conditions; one powder sample (Sample 3b) having a first width of 11 cm and first thickness of 2.5 cm and the other sample (Sample 3c) having a first width of 5 cm and first thickness of 4.5 cm. We observed that Sample 3b, upon microwave exposure, had approximately 20% of un-exfoliated graphite fibers possibly due to some of the powder was located beyond the focused microwave power zone. Sample 3c had approximately 15% of un-exfoliated graphite fibers possibly due to microwaves incapable of penetrating the entire depth of the powder.

Example 4: Preparation of Single-Layer Graphene Sheets from Meso-Carbon Micro-Beads (MCMBs)

Meso-carbon micro-beads (MCMBs) were supplied from China Steel Chemical Co., Kaohsiung, Taiwan. This material has a density of about 2.24 g/$cm^3$ with a median particle size of about 16 µm. In one example, MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected to microwave treatments. TEM and atomic force microscopic, and BET studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

Example 5: Preparation of Graphene Fluoride Nano Sheets

Several processes have been used by us to produce GF, but only one process is herein described as an example. In a typical procedure, highly oxidized artificial graphite was subjected to fluorination by vapors of chlorine trifluoride at 100° C. for 10 hours, leading to the formation of lightly fluorinated graphite. Pre-cooled Teflon reactor was filled with 20-30 mL of liquid pre-cooled $ClF_3$, the reactor was closed and cooled to liquid nitrogen temperature. Then, 1 g of lightly fluorinated graphite was put in a container with holes for $ClF_3$ gas to access and situated inside the reactor. In 7-10 days a gray-beige product with approximate formula $C_2F$ was formed.

These $C_2F$ particles were then exposed to microwave power (10 W) at 2.45 GHz for 60 seconds to obtain graphene fluoride sheets (>90% single-layer graphene fluoride sheets). The ribbon-shape powder was 1.5 cm wide and 1.5 cm thick prior to being moved into the microwave power zone. After microwave exposure for 1 minute, the ribbon was expanded to 44 cm wide and 4.6 cm thick.

Example 6: Preparation of Nitrogenated Graphene Nano Sheets and Porous Graphene Structures A hydrothermal method was used to convert graphite oxide (as that prepared in Example 1) into nitrogenated graphite. Particles of graphite oxide, along with ammonia were sealed in an autoclave and then the temperature was increased to 220° C. The reactions were allowed to proceed for 6 hours to obtain nitrogenated graphite particles. These particles were then exposed to microwave power (700 W) at 2.45 GHz for 60 seconds to obtain nitrogenated graphene sheets. The ribbon-shape powder was 1.1 cm wide and 1 cm thick prior to being moved into the microwave power zone. After microwave exposure for 1 minute (1 minute residence time), the ribbon was expanded to 39 cm wide and 3.5 cm thick.

Example 7: Preparation of Various Oxidized Graphite and Graphitic Carbon Materials Several oxidized graphitic carbon materials were prepared according to the same procedure as used in Example 1, but the starting graphite materials were powders of highly oriented pyrolytic graphite (HOPG), natural graphite powder, pitch-based graphite fiber, vapor-grown carbon nano-fiber (VG-CNF), multi-walled carbon nanotubes (MW-CNTs) and amorphous graphite, respectively. In each sample, up to 20% of water or alcohol was added to the oxidized graphite material as a dielectric heating promoter. We have surprisingly observed that a certain amount (e.g. 5%) of a dielectric heating promoter can significantly increase the amount of single-layer graphene sheets. The specific surface area was typically increased from 260-450 $m^2/g$ to 650-950 $m^2/g$.

Example 8: Preparation of Oxidized Graphitic Carbon from Soft Carbon Particles

Particles of soft carbon were prepared from a liquid crystalline aromatic resin. The resin was ground with a mortar, and calcined at 900° C. for 2 h in a $N_2$ atmosphere to prepare the graphitizable carbon, also referred to as or soft carbon. Particles of soft carbon were subjected to intercalation and microwave exposure treatments in a manner similar to what was done in Example 1. The resulting products were mostly small single-layer graphene sheets, plus some amorphous carbon powder.

Example 9: Preparation of Oxidized Graphitic Carbon from Petroleum Pitch-Derived Hard Carbon Particles A pitch sample (A-500 from Ashland Chemical Co.) was carbonized at 900° C. for 2 hours, followed by carbonization at 1,200° C. for 4 hours. A solution of KOH in water (5% concentration) was used to surface-treat the hard carbon particles for the purpose of removing the skin carbon layer of the pitch-based hard carbon particles. Hard carbon particles were subjected to intercalation and microwave exposure treatments in a manner similar to what was done in Example 1. The resulting products were mostly small single-layer graphene sheets, plus some amorphous carbon powder.

The invention claimed is:

1. A method of producing graphene from a microwave-expandable un-exfoliated graphite or graphitic carbon, said method comprising:
   (a) supplying and feeding a powder of said microwave-expandable un-exfoliated graphite or graphitic carbon onto a non-metallic solid substrate surface, wherein said powder is in a substantially ribbon shape having a first ribbon width and a first ribbon thickness, wherein said powder of microwave-expandable un-exfoliated graphite or graphitic carbon further contains 0.1% to 20% by weight of a dielectric heating promoter selected from water, polar organic molecule, or a combination thereof;
   (b) moving said ribbon-shape powder into a microwave applicator chamber containing a microwave power zone having a microwave application width and a microwave penetration depth, wherein said microwave application width is no less than said first ribbon width and said microwave penetration depth is no less than said first ribbon thickness so that the entire ribbon-shape powder receives and absorbs microwave power with a sufficient power level for a sufficient length of time to exfoliate and separate said microwave-expandable un-exfoliated graphite or graphitic carbon for producing graphene sheets that occupy an expanded volume having a second width, greater than said first ribbon width, and a second thickness, greater than said first ribbon thickness; and
   (c) moving said graphene sheets out of said microwave chamber, cooling said graphene sheets, and collecting said graphene sheets.

2. The method of claim 1 wherein said microwave-expandable un-exfoliated graphite or graphitic carbon is selected from intercalated natural graphite, oxidized natural graphite, fluorinated natural graphite, intercalated synthetic graphite, oxidized synthetic graphite, fluorinated synthetic graphite, intercalated amorphous graphite, oxidized amorphous graphite, fluorinated amorphous graphite, intercalated highly oriented pyrolytic graphite (HOPG), oxidized HOPG, fluorinated HOPG, intercalated meso-carbon micro-bead, oxidized meso-carbon micro-bead, fluorinated meso-phase carbon, intercalated needle coke, oxidized needle coke, fluorinated needle coke, intercalated carbon or graphite fiber, oxidized carbon or graphite fiber, fluorinated carbon or graphite fiber, intercalated carbon nano-fiber, oxidized carbon nano-fiber, fluorinated carbon nano-fiber, nitrogenated graphite, chlorinated graphite, brominated graphite, iodized graphite, or a combination thereof.

3. The method of claim 1 wherein a residence time for said microwave-expandable un-exfoliated graphite or graphitic carbon in said microwave power zone is from 10 seconds to 5 minutes.

4. The method of claim 1 wherein said residence time is from 30 seconds to 3 minutes.

5. The method of claim 1 wherein said first ribbon width is selected from the range of 1 mm to 10 cm and said first ribbon thickness is from 10 nm to 3.8 cm.

6. The method of claim 1 wherein said first ribbon width is selected from the range of 5 mm to 5 cm and said first ribbon thickness is from 1 μm to 2.5 cm.

7. The method of claim 1 wherein said first ribbon width is selected from the range of 1 cm to 3 cm and said first ribbon thickness is from 0.1 mm to 1.0 cm.

8. The method of claim 1 wherein said powder of microwave-expandable un-exfoliated graphite or graphitic carbon is fed and moved into microwave application chamber in a continuous or intermittent manner.

9. The method of claim 1, wherein said graphene sheets are subjected to a mechanical shearing treatment to produce smaller graphene sheets.

10. The method of claim 9, wherein said mechanical shearing treatment comprises using air milling, air jet milling, ball milling, rotating-blade mechanical shearing, ultrasonication, cavitation, or a combination thereof.

11. The method of claim 1 wherein said graphene contains single-layer graphene sheets.

12. The method of claim 1 wherein said graphene contains at least 80% single-layer graphene sheets.

13. The method of claim 1 wherein said graphene contains pristine graphene, oxidized graphene with less than 5% oxygen content by weight, graphene fluoride, graphene fluoride with less than 5% fluorine by weight, graphene with a carbon content no less than 95% by weight, or functionalized graphene.

14. A method of producing graphene from a microwave-expandable un-exfoliated graphite or graphitic carbon, said method comprising:
(a) supplying and feeding a powder of said microwave-expandable un-exfoliated graphite or graphitic carbon onto a non-metallic solid substrate surface, wherein said powder is in a substantially ribbon shape having a first ribbon width and a first ribbon thickness;
(b) moving said ribbon-shape powder into a microwave applicator chamber containing a microwave power zone having a microwave application width and a microwave penetration depth, wherein said microwave application width is no less than said first ribbon width and said microwave penetration depth is no less than said first ribbon thickness so that the entire ribbon-shape powder receives and absorbs microwave power with a sufficient power level for a sufficient length of time to exfoliate and separate said microwave-expandable un-exfoliated graphite or graphitic carbon for producing graphene sheets that occupy an expanded volume having a second width, greater than said first ribbon width, and a second thickness, greater than said first ribbon thickness, wherein a ratio of said second width to said first ribbon width is from 3 to 300; and
(c) moving said graphene sheets out of said microwave chamber, cooling said graphene sheets, and collecting said graphene sheets.

15. A method of producing graphene from a microwave-expandable un-exfoliated graphite or graphitic carbon, said method comprising: (a) supplying and feeding a volume of the microwave-expandable un-exfoliated graphite or graphitic carbon powder onto a solid substrate surface, wherein the powder volume has a maximum width and a maximum thickness, wherein the microwave-expandable un-exfoliated graphite or graphitic carbon powder further contains a dielectric heating promoter selected from water, polar organic molecule, or a combination thereof; (b) moving the powder into a microwave applicator chamber containing a microwave power zone having a microwave application width and a microwave penetration depth, wherein the microwave application width is no less than the maximum width of the powder volume and the microwave penetration depth is no less than the maximum thickness of the powder volume so that the entire powder volume receives and absorbs microwave power with a sufficient power level for a sufficient length of time to exfoliate and separate the microwave-expandable un-exfoliated graphite or graphitic carbon into graphene sheets that occupy an expanded volume having a second width, greater than the maximum width, and a second thickness, greater than the maximum thickness; and (c) moving the graphene sheets out of the microwave chamber, cooling the graphene sheets, and collecting the graphene sheets.

* * * * *